Dec. 22, 1953  B. A. GRAYBEAL  2,663,051
METHOD AND APPARATUS FOR FIBERIZING MINERAL MATERIALS
Filed Jan. 24, 1951

INVENTOR.
BRUCE ANDREW GRAYBEAL
BY Virgil O. Kline
ATTORNEY

Patented Dec. 22, 1953

2,663,051

UNITED STATES PATENT OFFICE 2,663,051

METHOD AND APPARATUS FOR FIBERIZING MINERAL MATERIALS

Bruce Andrew Graybeal, Conowingo, Md., assignor to Johns-Manville Corporation, New York, N. Y., a corporation of New York Application January 24, 1951, Serial No. 207,631

5 Claims. (Cl. 18—2.6)

1

The present invention relates to the manufacture of mineral wool and, more particularly, to an improved mineral wool fiberizing method and apparatus. The term "mineral wool" is employed in the instant application in a generic sense to include wool or fibers formed from rock, slag, fused clay, mixtures thereof, and other heat-liquefiable, raw materials capable of being converted into fibers.

It has been proposed to fiberize such materials by a spinning process in which a stream of the molten material is discharged onto one or a plurality of cooperating spinners or rotors rotated at high speed, the centrifugal forces set up causing portions of the material on the rotors to be drawn out into fibers. Apparatus and method of this type is shown and claimed in the patent of Edward R. Powell, #2,428,810, issued October 14, 1947, and in the copending applications of Edward R. Powell, S. N. 555,359, filed September 22, 1944 and S. N. 51,750, filed September 29, 1948, and now Patents No. 2,520,168 and No. 2,520,169, respectively.

The instant invention has for its principal object the provision of an improved apparatus and method adapted to be employed in spinning apparatus of the type shown in said patent and applications and which promotes wider distribution of the material over the surfaces of the fiberizing rotors whereby a higher production rate and more efficient operation are achieved.

Another object of the invention is the provision of a method and apparatus in which a reciprocating or oscillating movement is imparted to the stream of molten material issuing from the melting furnace whereby the wider distribution of the material over the surface of the rotors, and increased fiberization areas are obtained.

More specifically an object of the invention is the provision of an apparatus and method involving a distributor trough in the path of the stream discharged from the melting furnace, the trough being mounted for rapid reciprocation or oscillation to impart a similar motion to the material discharged therefrom and intercepted by the fiberizing device.

Figure 1:
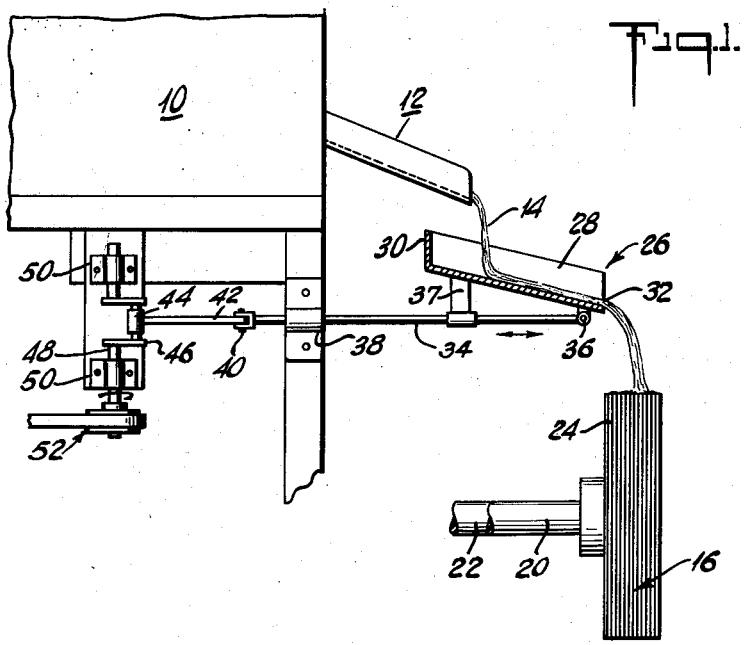
Figure 2:
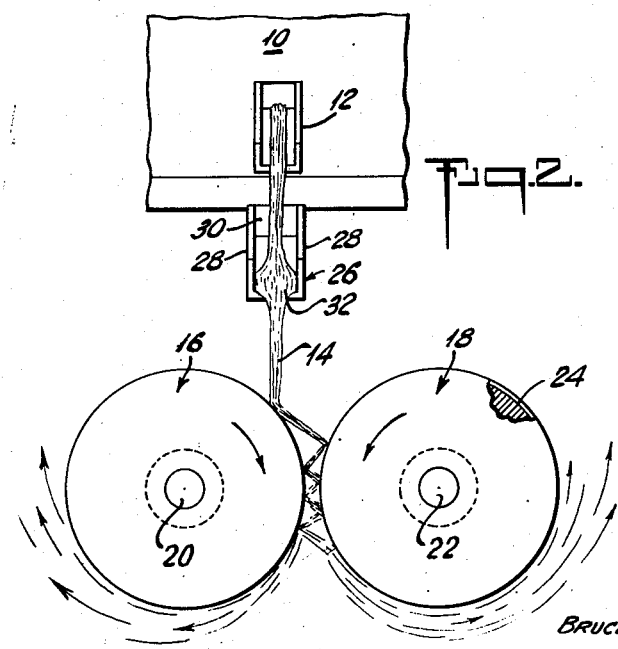

My invention will be more fully understood and further objects and advantages will become apparent when reference is made to the following detailed description of a preferred embodiment of the invention and to the accompanying drawings in which:

Fig. 1 is a diagrammatic, side elevational view of an apparatus embodying the invention; and Fig. 2 is a front elevational view, on an enlarged scale, of the fiberizing and stream distributing apparatus.

2

Referring now to the drawings, there is shown an apparatus comprising a melting furnace 10 which may be of any suitable type, such as a cupola, tank furnace, or the like. The furnace includes a discharge trough 12 by which a stream of molten material 14 is drawn from the furnace and allowed to fall by gravity. The raw material melted in the furnace and delivered in the form of a molten stream may be any of the materials conventionally used in the manufacture of mineral wool or other liquefiable materials suitable for conversion into fibrous wool by the method and on the apparatus hereinafter described.

Insofar as the instant invention is concerned, the fiberizing operation may be performed by any suitable type of multiple rotor fiberizing apparatus, such as that disclosed in said Powell patents, and constituting two, three, four or more rotors. Also, for some purposes only a single rotor may be employed. In the drawing a two-rotor construction similar to that shown in said Powell Patent #2,428,810 is shown, but it will be appreciated that this is for purposes of illustration only and that the invention may be used and its advantages achieved with the other mentioned types of fiberizing devices where spreading or distribution of the original stream is desired.

In the embodiment shown, the fiberizing rotors are indicated at 16 and 18, the rotors being supported on shafts 20 and 22, respectively, for rotation therewith. The shafts are driven by any suitable means, indicated only diagrammatically, at relatively high speeds and in the directions indicated by the arrows in Fig. 2. The rotors are of heat-resistant steel or other alloy of a character to chill and bond a portion of the material and thus resist the high temperature of the molten material, which may run as high as 2900° F. without excessive erosion or wear. The surfaces of the rotors may be provided with means to insure the bonding of a ring or rings of the molten material thereto, this means consisting of a series of preformed, relatively fine grooves 24, or of the roughened or other surface characteristics of the rotors developed after they have been subjected for a period of time to the action of the molten material. However, for both rotors of the two-rotor system illustrated, or for the main fiberizing rotors of a system employing a greater number of rotors, the more positive bonding means, such as the grooves 24, is preferred.

In accordance with the instant invention, a stream distributor, indicated generally at 26, is supported in the path of the stream 14. The distributor comprising a trough 28, suitably having a closed rear end 30 and a forward open discharge end 32, is positioned with its discharge end at a lower point than the closed end to promote the flow of the material from the trough.

The trough is carried by means by which it is given a relatively rapid reciprocating, oscillating or vibratory motion. In the device illustrated, this means consists of a supporting rod 34 fixed to the trough as by bolt 36 and bracket 37, the rod being mounted for sliding movement in a bearing 38 carried by any suitable fixed element of the apparatus. Arm 34 is pivotally connected by a pin 40 to a connecting rod 42 which has a bearing 44 on the crank 46 of a crankshaft 48. The latter is supported in suitable bearings 50 carried by frame members of the apparatus. The crank is adapted to be rotated at a desired R. P. M. by suitable means, such as pulley 52 fixed to an extending end of the crankshaft and belt driven by a motor or the like (not shown).

In the operation of the apparatus described above and in carrying out the method of the instant invention, the fiberizing device is positioned relatively to the delivery end of trough 28, when the latter is in its intermediate position, so that molten material falling from the trough by gravity would strike rotor 16 substantially centrally of the width, and on a downturning segment, of its peripheral surface. Crankshaft 48 is driven to cause a rapid reciprocating, oscillating or vibrating movement of the trough 26 laterally of the rotor surface and hence in a direction generally parallel to the axis of rotation of the rotor, with the result that the stream issuing from the discharge end of the trough has a similar reciprocatory, oscillatory or vibratory motion imparted to it. The stream, intercepted by the surface of rotor 16 will, as is readily apparent, be distributed over a much wider lateral area of the rotor than would be the case if the original stream 14 were directly intercepted by the rotor.

The length of the stroke of connecting rod 42 and, hence, of the path of reciprocation of the trough 28, and also the rapidity of reciprocation, will depend upon the character of distribution of the material desired. For purposes of example, and without limiting the invention thereto, it has been found that an original stream of the molten material of conventional size, say ½" in diameter, can be distributed to form a continuous band over a 1½" width of the surface of initial rotor 16 by reciprocating trough 28 through a ½" stroke at the rate of three strokes per second.

Rotors 16 and 18 are driven at relatively high speeds and in opposite directions, as indicated by the arrows, and the distributed or spread stream of material intercepted by rotor 16 is partially bonded thereto, and the excess material over that bonded is discharged onto rotor 18 where it bonds to the surface of the rotor. Any excess over that bonded is again projected back against the initial rotor 16. The high speed rotation of rotors 16 and 18 causes portions of the bonded material to be drawn or thrown from the rotors by the centrifugal forces created, these portions being drawn out into long, fine fibers. A similar operation is performed if a larger number of rotors is used, such as the three rotors shown in said Powell Patent No. 2,520,168, or the four rotors shown in said Powell Patent No. 2,520,169. In such cases, however, the material is lightly bonded, if bonded at all, to the initial rotors, the other rotors performing the main fiberizing function. In any case the wide distribution of the material on the initial or primary rotor through the use of the instant invention correspondingly increases the width of distribution of the material on the other rotors and, hence, increases the area of the material exposed to the fiberizing action.

Having thus described my invention in rather full detail, it will be understood that these details need not be strictly adhered to but that various changes and modifications may suggest themselves to one skilled in the art, all falling within the scope of the invention as defined by the subjoined claims.

What I claim is:

1. In an apparatus for converting a molten raw material into fibers, first means for discharging a stream of said material, a rotor having an axis of rotation and a peripheral surface, said peripheral surface being positioned to intercept said stream, and second means for imparting a reciprocatory motion to said first means in a direction generally parallel to said axis of rotation, whereby said stream repeatedly traverses and is distributed over the width of said peripheral surface.

2. In an apparatus for converting a molten raw material into fibers, first means for delivering a stream of said material, second means for intercepting and discharging said stream, a rotor having an axis of rotation and a peripheral surface, said peripheral surface being positioned to intercept material discharged from said second means, and third means for imparting a reciprocatory motion to said second means in a direction generally parallel to said axis of rotation, whereby said stream repeatedly traverses and is distributed over the width of said peripheral surface.

3. In an apparatus for converting a molten raw material into fibers, means for delivering a stream of said material, a trough positioned to intercept and discharge said stream, a rotor having an axis of rotation and a peripheral surface, said peripheral surface being positioned to intercept material discharged from said trough, and means for imparting a reciprocatory motion to said trough in a direction generally parallel to said axis, whereby said stream repeatedly traverses and is distributed over the width of said peripheral surface.

4. In a method of forming fibers from a molten raw material, discharging a stream of said material and imparting an oscillatory motion thereto to form an oscillating stream, positioning a rotor with its axis of rotation extending in a direction generally parallel to the direction of oscillation of said stream, and intercepting said oscillating stream on the peripheral surface of said rotor.

5. In a method of forming fibers from a molten raw material, delivering a stream of said material, intercepting, discharging and imparting an oscillatory motion to said stream to form an oscillating stream, positioning a rotor with its axis of rotation extending in a direction generally parallel to the direction of oscillation of said stream, and intercepting said oscillating stream on the peripheral surface of said rotor.

BRUCE ANDREW GRAYBEAL.

References Cited in the file of this patent

UNITED STATES PATENTS

| Number | Name | Date |
| --- | --- | --- |
| 180,470 | Elbers | Aug. 1, 1876 |
| 1,679,385 | Stay et al. | Aug. 7, 1928 |
| 2,398,707 | Hawthorne et al. | Apr. 16, 1946 |
| 2,456,439 | Morane et al. | Dec. 14, 1948 |
| 2,518,744 | Barnard | Aug. 15, 1950 |